United States Patent
Au et al.

(10) Patent No.: US 6,498,693 B1
(45) Date of Patent: Dec. 24, 2002

(54) METHOD AND SYSTEM FOR MR OFFSET CALIBRATION

(75) Inventors: Andrew Hoan Au, Palo Alto, CA (US); Robert Li, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/365,429

(22) Filed: Aug. 2, 1999

(51) Int. Cl.[7] .......................... G11B 27/36; G11B 5/03; G11B 21/02
(52) U.S. Cl. .......................... 360/31; 360/66; 360/75; 360/77.02
(58) Field of Search .......................... 360/76, 75, 31, 360/53, 66, 77.02

(56) References Cited

U.S. PATENT DOCUMENTS

| 6,025,712 A | * | 2/2000 | Mian .......................... 324/210 |
| 6,141,168 A | * | 10/2000 | Takahashi et al. ............ 360/66 |
| 6,249,394 B1 | * | 6/2001 | Li et al. ........................ 360/31 |
| 6,249,399 B1 | * | 6/2001 | Chainer et al. ............... 360/75 |

FOREIGN PATENT DOCUMENTS

JP 09-147337 * 6/1997

* cited by examiner

*Primary Examiner*—Andrew L. Sniezek
(74) *Attorney, Agent, or Firm*—Sawyer Law Group LLP

(57) ABSTRACT

Method and system aspects for calibrating an MR offset in an MR head are presented. A method aspect includes identifying an occurrence of a calibration condition to initiate an MR offset check, and performing the MR offset check to ensure an MR offset value has not changed beyond an acceptable tolerance in order to maintain proper servoing of the MR head. A system aspect includes a hard disk for storing data, a read/write MR head for reading and writing data to/from the hard disk, and a control unit. The control unit performs an MR offset calibration of an MR offset value for the read/write MR head in response to a calibration condition occurring in order to ensure maintenance of the MR offset value within an acceptable tolerance for proper servoing of the read/write MR head.

28 Claims, 4 Drawing Sheets

METHOD AND SYSTEM FOR MR OFFSET CALIBRATION

FIELD OF THE INVENTION

The present invention relates generally to magnetoresistive (MR) heads in disk drives and more particularly to offset calibration of MR heads.

BACKGROUND OF THE INVENTION

Digital data storage conventionally utilizes disk drives with rotating rigid disks. Technology improvements have tried to increase the storage capacity and accuracy of disk drives while reducing the weight and power consumption through improvements to each element of the disk drive. In modern disk drives, innovations of anisotropic magnetoresistive (AMR) and giant magnetoresistive (GMR) heads have improved writing and reading of data through the use of separate elements in the recording head as the head flies over a spinning disk. Thus, a writing element writes bits onto the disk, while a reading element reads the bits from the disk by detecting the presence of faint but Emidentifying magnetic fields. The head consists of a thin film inductive write element and an MR read element, i.e., an AMR or GMR sensor between first and second magnetic shields. The read element is typically narrower than the write element to improve the offtrack performance.

In practice, there is an offset between the center of the read and write elements due to longitudinal separation of the elements. When used with a rotary actuator, the head is skewed with respect to the tracks as the actuator moves across the disk. The result is a lateral offset between the read and write head centerlines. Optimum performance is achieved by centering the read head over the data track for read operations and centering the write head over the data track for write operations, which can cause the read head to be partially off-track during a write operation. The geometric offset of the write and read head elements is generally referred to as the MR offset of the MR head. Manifestation of the MR offset is usually seen magnetically and is termed the write-to-read (W/R) offset of the MR head. The terms MR offset and W/R offset are often used interchangeably, and for the purposes of this disclosure, the generally accepted reference of MR offset is used throughout. A large offset is usually not desirable because it requires more time to allow the actuator to center the read element over the data track. This impacts the overall performance of the system.

MR heads may have many forms of instability. One example of instbility is Magnetic Center Shift (MCS), and another example is amplitude instability. The MCS instability usually occurs through one or more stress conditions such as thermal, electrical, magnetic and results in a shift in the W/R offset from the pre-stressed state. The same stress conditions can also engender amplitude instability in which the MR head output signal loses strength.

Voltage and/or current pulses are often used to RESET amplitude instability in MR heads. For example, certain GMR heads with low blocking temperature anti-ferro magnetic materials are resettable through the use of a voltage/current pulse. While the term "RESET pulse" refers particularly to this pulse for those GMR heads, it is here generalized to mean any voltage or current that deviates from the intended value. For example, if the intended long term MR bias current is 5 milliamps, then the application of 6 milliamps bias current can be considered to be a 'RESET current pulse'. However, resetting can adversely affect the MR offset. For example, in a straight line model for the MR offset, the resetting can result in an MR offset that has an opposite offset and/or slope than before the resetting action. Such a change can cause the servo to move in the wrong direction and lead to data erasures resulting in unrecoverable hard data checks.

Accordingly, what is needed is a system and method for calibrating an MR offset, particularly following an MR reset. The present invention addresses such a need.

SUMMARY OF THE INVENTION

The present invention provides method and system aspects for calibrating an MR offset in an MR head. A method aspect includes identifying an occurrence of a calibration condition to initiate an MR offset check, and performing the MR offset check to ensure an MR offset value has not changed beyond an acceptable tolerance in order to maintain proper servoing of the MR head. A system aspect includes a hard disk for storing data, a read/write MR head for reading and writing data to/from the hard disk, and a control unit. The control unit performs an MR offset calibration of an MR offset value for the read/write MR head in response to a calibration condition occurring in order to ensure maintenance of the MR offset value within an acceptable tolerance for proper servoing of the read/write MR head.

Through the present invention, MR offset calibrations are accomplished in a straightforward and efficient manner. These and other advantages of the aspects of the present invention will be more fully understood in conjunction with the following detailed description and accompanying drawings.

DETAILED DESCRIPTION OF THE INVENTION

The present invention relates to offset calibration in an MR head. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
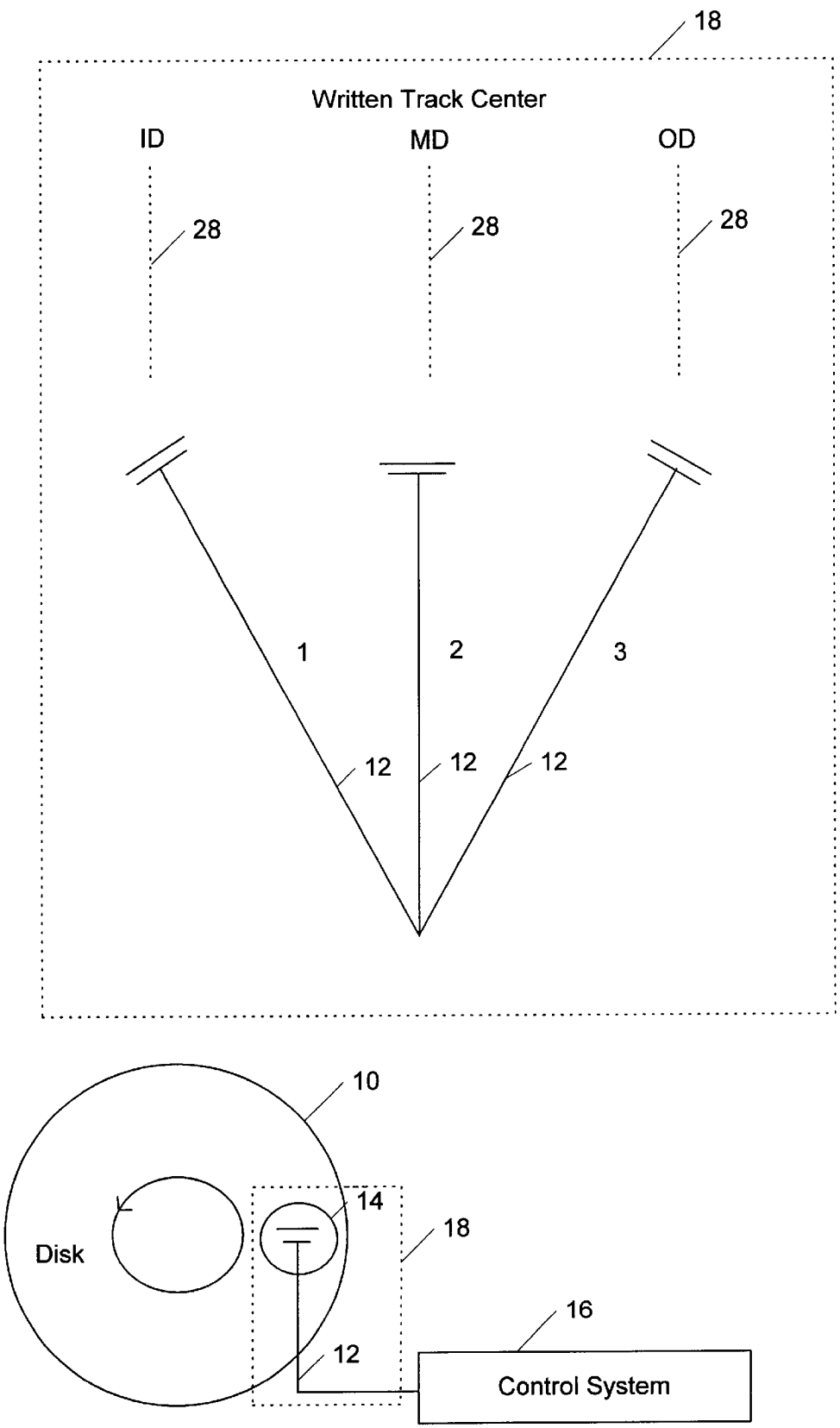
FIG. 1 illustrates a partial top view of a disk drive system in accordance with the present invention.

FIG. 1 illustrates a partial top view of a disk drive system that includes a disk 10 and an arm 12 that is suspended over the disk 10. Further included is an MR head 14, which is moved to a particular track position of disk 10 via control system 16, the control system 16 including processing devices and memory devices to control the operations of the disk drive system, as is well known in the art. The enlarged view 18 of the arm 12 position shows the location of the MR head 14 at three locations, inner diameter (ID), mid-diameter (MD), and outer diameter (OD), of the disk 10. A skew is introduced by the swing-arm fixed pivot actuator as the arm 12 moves over the radius of the disk 10 due to a separation between the read and write sensors of the MR 14, as demonstrated by the enlarged view of MR head 14 in FIG. 2.

Figure 2:
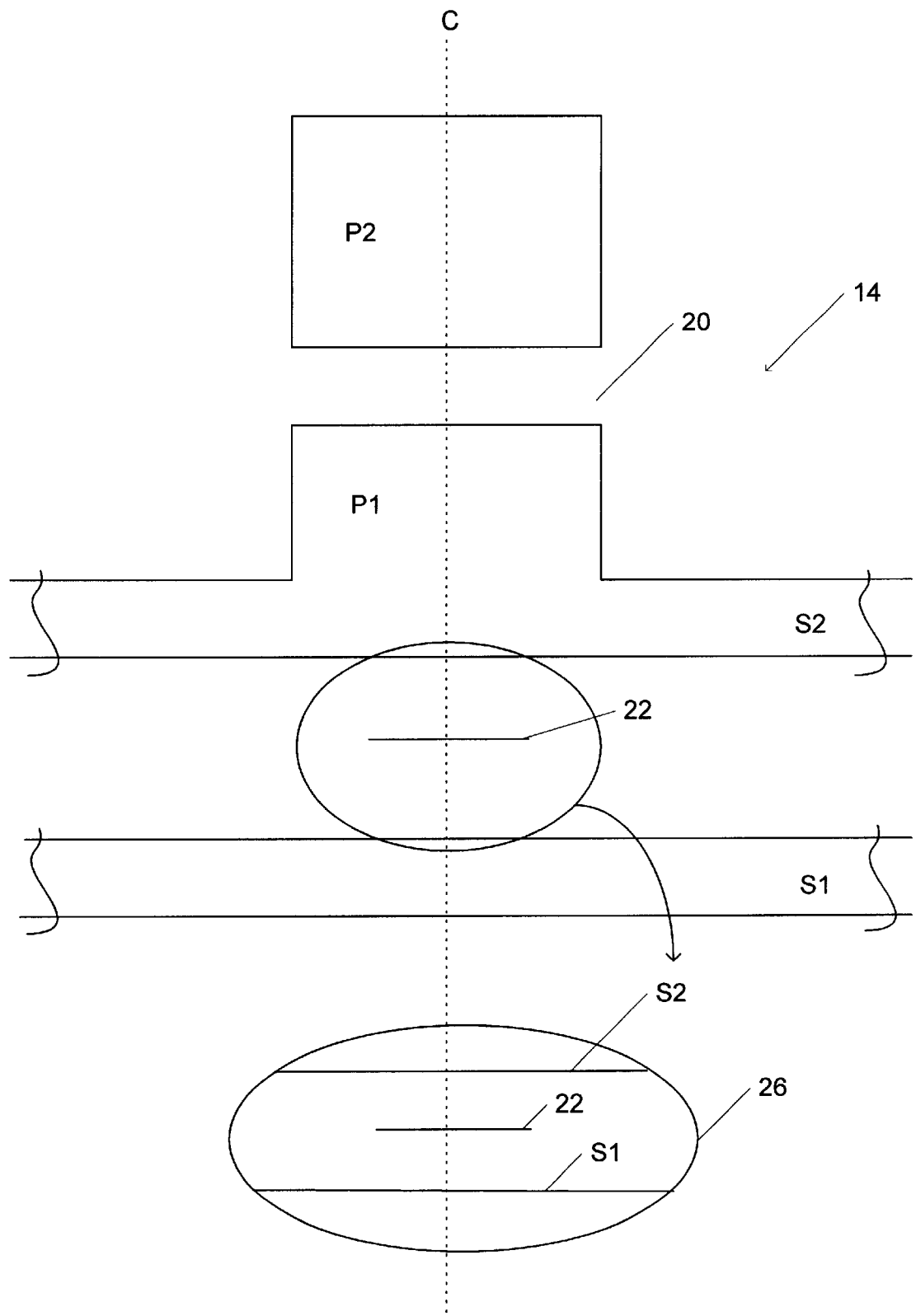
FIG. 2 illustrates an enlarged view of the MR head of FIG. 1.

As shown in FIG. 2, a write head gap 20 is defined by the pole tips, P1 and P2. A read sensor 22, e.g., a GMR head, is sandwiched between two shields, S1 and S2. While FIG. 2 illustrates the read sensor 22 as aligned with the center of the write sensor, the alignment is subject to manufacturing tolerances. Thus, the magnetic properties of the read sensor 22, such as a non-uniform distribution of the magnetic moments within the sensor, may result in the physical placement of the read sensor 22 being offset from the physical center, C, of the write sensor, as described previously.

With the skew introduced by the separation between the read sensor and write sensor of the MR head 14, the read sensor has to be moved relative to the write sensor's position everywhere except at the MD position. The amount of movement is termed the MR offset, which determines the amount of track offset for positioning of a head at a particular disk radius that allows the MR head to receive maximum magnetic flux from the written data on the track. For example, at the OD, the read sensor has to move more toward the OD direction of the disk 10 in order to center the read sensor over the written track, where the center of the written track is represented in FIG. 1 by dashed line 28.

Figure 3:
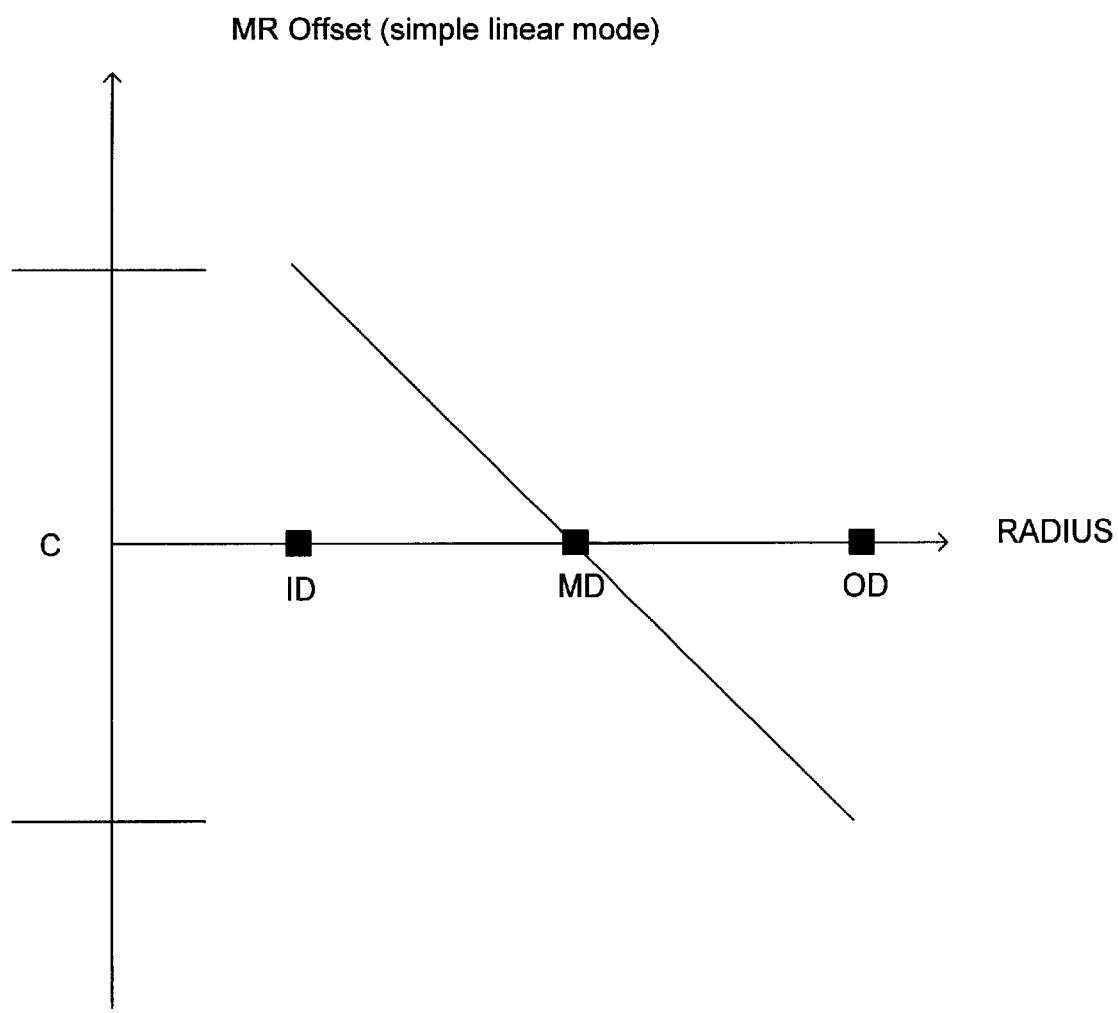
FIG. 3 illustrates a graph representation of a linear model of MR offset.

MR offset can be specified in many forms. The simplest is the straight line model, which is represented by two parameters, a specified intercept and slope covering the full disk radius. A graph illustration of the MR offset using a simple linear model is presented in FIG. 3. As shown in FIG. 3, the amount of offset varies with the radius and can be determined by measuring the offset at two track locations, which are preferably far apart for better accuracy. By way of example, an approach to obtain an intercept and/or slope for the linear model includes writing a track, and through the use of servo position, reading MR amplitude values or their equivalents (e.g., error rates, mean squared errors (MSE)) at the outer diameter and inner diameter. The highest MR amplitude value between the inner and outer diameter provides an indication of the best position for the head at that track.

The present invention would in a preferred embodiment utilize the above-identified approach and linear model in order to calibrate the MR offset via the control system 16. In the present invention, the MR offset parameters are dynamically modified for the linear model, by allocating storage to accommodate the offset adjustment factors obtained at two suitably separated track locations. In addition, during manufacturing, an MR offset calibration determination can be performed before and after a RESET action. The two measurements can then be compared to eliminate potentially problematic heads. In a further example, the two MR offsets can be stored in a register file for In-line Data Recovery Procedure (DRP) usage. Accordingly, the present invention could be implemented in hardware, software, or firmware via a computer readable medium or the like either within the disk drive assembly or outside of the assembly dependent upon the application. The calibration in accordance with the present invention accounts for changes in magnetic centers of the head as a result of MR head instabilities and is described with reference to the flow diagram of FIG. 4.

Figure 4:
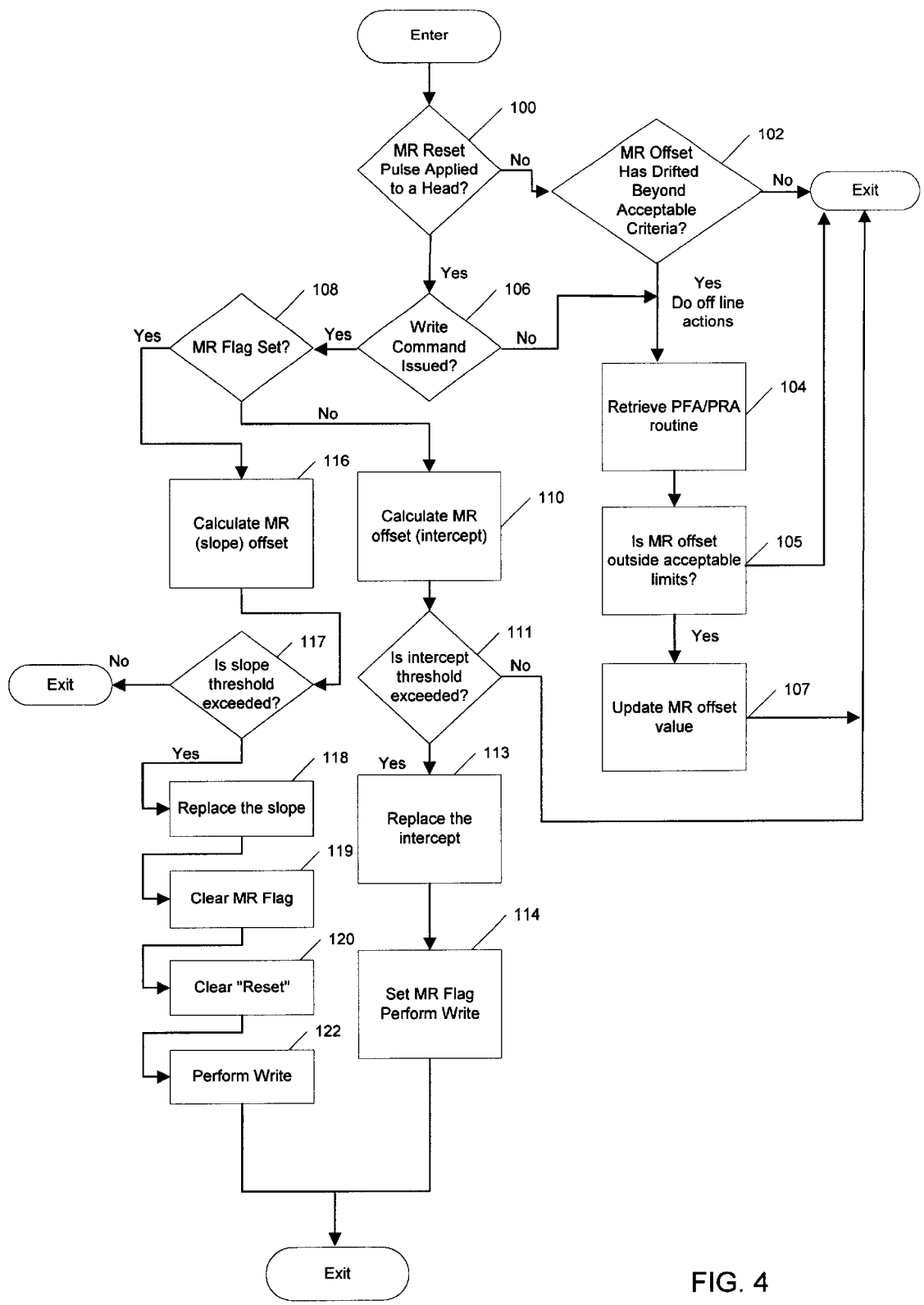
FIG. 4 illustrates a flow diagram for calibrating an MR offset in accordance with the present invention.

Referring to the flow diagram of FIG. 4, a calibration of the offset is done in response to a calibration condition occurring. Thus, the process initiates with a determination of whether a RESET pulse has occurred (step 100). As described previously voltage and/or current pulses are often used to RESET amplitude instability in MR heads. If no RESET pulse has occurred as a calibration condition, it is then determined whether the monitored MR offset has drifted beyond an acceptable criteria (step 102). By way of example, the monitoring of the MR offset may be achieved by 5 collecting the servo short-move changes via switching among the heads in the disk drive and then averaging over the relative offset of the heads for comparison against a threshold. Thereafter, a predictive failure analysis/ predictive recovery analysis routine (PFA/PRA) is retrieved (step 104). If the MR offset remains acceptable, as determined via step 105, no further calibration action is necessary. When the offset has drifted beyond acceptable 112 limits, a new MR offset is obtained as part of the predictive failure/recovery analysis routine, which is then saved to either replace an old value or become the active value (step 107). In a preferred embodiment, steps 104, 105 and 107 are performed as a set of offline actions.

If the RESET pulse has been applied, the necessary adjustments to the offset are made in the disk drive before writing customer data to the disk. When a write operation has not yet been issued, as determined via step 106, then the MR offset determination task may be deferred as the set of off-line actions (steps 104, 105, and 107). When a write command has been issued, and an MR flag is not set, as determined via step 108, the intercept value of the linear model for the MR offset is calculated according to aforementioned standard techniques for subsequent comparison with a currently stored intercept value, utilizing preferably a write cache of the control system of the drive as needed, via step 110. If the comparison, via step 111, determines that the difference between the values exceeds a predetermined threshold, the intercept value is replaced with the calculated value with an assumption of no change in the slope, via step 113. The MR flag is then set and the write operation is performed, via step 114. If the comparison determines that the predetermined threshold has not been exceeded, the routine terminates.

For a write command issuance with the MR flag set (i.e., step 108 is affirmative), the MR offset slope is calculated via step 116 and compared with a stored slope value, via step 117 so that the slope value can be replaced if a predetermined slope threshold has been exceeded, via step 118. If not exceeded, the routine is terminated. The MR flag is then cleared, via step 119. Thereafter a RESET flag is cleared, via step 120. Finally, a write operation is performed, via step 122.

Typically, a drive design limits the maximum MR offsets to half of the track pitch. For example, if the track pitch is at 70 micro-inches, then the maximum MR offset would be +/−35 micro-inches. As the tracks per inch (TPI) increases, the MR offset will become increasingly critical to a successful drive design.

As to the threshold values for the present invention, the values are dependent upon particular design needs, including the repeatability of the MR offset measurement process. In general, the thresholds should be placed outside the range of measurement repeatability, e.g., outside a 2 to 3 sigma deviation. For example, in general, a threshold of 10–15 microinches would be suitable for a repeatability having a 5 microinch deviation. The drive mechanical tolerances, such as spindle run outs or general track misregistration (TMR), in addition to electrical noises, can also affect repeatability.

Through the present invention, MR offset calibrations are accomplished in a straightforward and efficient manner. The dynamic modification of the MR offset parameters occurs, for the linear model, by allocating storage to accommodate the offset adjustment factors obtained at two suitably separated track locations, as well as the track identifiers. Further, during manufacturing, the MR offset calibration determination can be performed before and after a RESET action and/or other stress actions such as high temperature. The two measurements can then be compared to eliminate potentially problematic heads. In addition, the two MR offsets can be stored in a file for In-line Data Recovery Procedure (DRP) usage.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for calibrating a magnetoresistive (MR) offset in an MR head by reading amplitude values at a first diameter and a second diameter of a track, the method comprising the steps of:
    (a) identifying an occurrence of a calibration condition to initiate an MR offset check, including determining whether a reset pulse has occurred; and
    (b) performing the MR offset check to ensure an MR offset value has not changed beyond an acceptable tolerance in order to maintain proper servoing of the MR head.

2. The method of claim 1 wherein when the reset pulse has not occurred, determining whether the MR offset has violated an acceptable threshold level.

3. The method of claim 2 wherein when the MR offset has violated the acceptable threshold level, the method further comprises the step of obtaining a new MR offset during a predictive failure analysis routine.

4. The method of claim 1 wherein when the reset pulse has occurred, the method further comprises the steps of determining whether a write command has been issued, and when a write command has not been issued, obtaining a new MR offset during a predictive failure analysis routine.

5. The method of claim 4 wherein when a write command has been issued, the method further comprises the step of determining whether an MR flag has been set, wherein when the MR flag has been set, an MR offset slope value is determined to identify if the MR offset slope value exceeds a slope threshold.

6. The method of claim 5 further comprising the step of updating an MR slope with the MR slope value when the slope threshold is exceeded, clearing the MR flag, clearing the reset pulse, and performing a write operation for the write command.

7. The method of claim 5 wherein when the MR flag has not been set, the method further comprises the steps of determining an MR offset intercept value to identify whether an intercept threshold has been exceeded and updating an MR intercept with the MR offset intercept value when the intercept threshold has been exceeded.

8. The method of claim 7 further comprising the step of setting the MR flag and performing a write operation for the write command.

9. The method of claim 1 wherein the first diameter of the track comprises an inner diameter and the second diameter of the track comprises an outer diameter.

10. A hard disk drive system with a calibrated magnetoresistive (MR) offset, the system comprising:

a hard disk for storing data;
a read/write MR head for reading and writing data to/from the hard disk; and
a control unit for performing an MR offset calibration of an MR offset value for the read/write MR head in response to a calibration condition occurring, including determining whether a reset pulse has occurred, in order to ensure maintenance of the MR offset value within an acceptable tolerance for proper servoing of the read/write MR head.

11. The system of claim 10 wherein when the reset pulse has not occurred, the control unit determines whether the MR offset has violated an acceptable threshold level.

12. The system of claim 11 wherein when the MR offset has violated the acceptable threshold level, the control unit further obtains a new MR offset during a predictive failure analysis routine.

13. The system of claim 10 wherein when the reset pulse has occurred, the control unit determines whether a write command has been issued, and when a write command has not been issued, the control unit obtains a new MR offset during a predictive failure analysis routine.

14. The system of claim 13 wherein when a write command has been issued, the control unit determines whether an MR flag has been set, wherein when the MR flag has been set, the control unit determines an MR offset slope value to identify if the MR offset slope value exceeds a slope threshold.

15. The system of claim 14 wherein the control unit updates an MR slope with the MR slope value when the slope threshold is exceeded, clears the MR flag, clears the reset pulse, and performs a write operation for the write command.

16. The system of claim 14 wherein when the MR flag has not been set, the control unit determines an MR offset intercept value to identify whether an intercept threshold has been exceeded and updates an MR intercept with the MR offset intercept value when the intercept threshold has been exceeded.

17. The system of claim 16 wherein the control unit sets the MR flag and performs a write operation for the write command.

18. A method for calibrating a magnetoresistive (MR) offset in an MR head, the method comprising:
    utilizing a linear model for representation of a magnetoresistive (MR) offset for an MR head of a disk drive, by reading amplitude values at a first diameter and a second diameter of a track;
    deterining whether a reset pulse for the MR head has been applied;
    performing a first calibration routine when the reset pulse has not been applied; and
    performing a second calibration routine when the reset pulse has been applied.

19. The method of claim 18 wherein the linear model comprises a slope and an intercept.

20. The method of claim 19 wherein the second calibration routine occurs when a write command has been issued and determines whether an MR flag has been set.

21. The method of claim 20 further comprising computing a current intercept for comparison with the intercept when the MR flag has not been set, and updating the intercept to the current intercept when the comparison determines an exceeded threshold.

22. The method of claim 21 further comprising setting the MR flag and performing a write operation for the write command.

23. The method of claim 20 further comprising computing a current slope for comparison with the slope when the MR flag has been set, and updating the slope to the current slope when the comparison determines an exceeded threshold.

24. The method of claim 23 further comprising resetting the MR flag and performing a write operation for the write command.

25. The method of claim 18 wherein the first calibration routine determines whether the MR offset has exceeded an acceptable threshold, and obtains a new MR offset during a predictive failure analysis routine when the MR offset has exceeded an acceptable threshold.

26. The method of claim 18 wherein the first diameter of the track comprises an inner diameter and the second diameter of the track comprises an outer diameter.

27. A computer readable medium containing program instructions for calibrating a magnetoresistive (MR) offset in an MR head by reading amplitude values at an inner diameter and outer diameter of a track, the instructions comprising:

(a) identifing an occurrence of a calibration condition to initiate an MR offset check, including determining whether a reset pulse has occurred; and (b) performing the MR offset check to ensure an MR offset value has not changed beyond an acceptable tolerance in order to maintain proper servoing of the MR head.

28. A computer readable medium containing program instructions for calibrating a magnetoresistive (MR) offset in an MR head, the program instructions comprising:

utilizing a linear model for representation of a magnetoresistive (MR) offset for an MR head of a disk drive by reading amplitude values at a first and a second diameter of a track;

determining whether a reset pulse for the MR head has been applied;

performing a first calibration routine when the reset pulse has not been applied; and performing a second calibration routine when the reset pulse has been applied.

* * * * *